United States Patent
Eloy et al.

(10) Patent No.: US 11,591,979 B2
(45) Date of Patent: Feb. 28, 2023

(54) METHOD FOR SYNCHRONIZING AN INTERNAL COMBUSTION ENGINE

(71) Applicant: VITESCO TECHNOLOGIES GMBH, Hannover (DE)

(72) Inventors: Stéphane Eloy, Toulouse (FR); Fabien Joseph, Toulouse (FR)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 17/604,581

(22) PCT Filed: Apr. 16, 2020

(86) PCT No.: PCT/EP2020/060717
§ 371 (c)(1),
(2) Date: Oct. 18, 2021

(87) PCT Pub. No.: WO2020/212497
PCT Pub. Date: Oct. 22, 2020

(65) Prior Publication Data
US 2022/0186673 A1    Jun. 16, 2022

(30) Foreign Application Priority Data
Apr. 19, 2019 (FR) .................. 1904207

(51) Int. Cl.
*F02D 41/00* (2006.01)
*F02P 7/06* (2006.01)
(Continued)

(52) U.S. Cl.
CPC ............. *F02D 41/009* (2013.01); *F02P 7/06* (2013.01); *G01D 5/24495* (2013.01); *F01L 2820/041* (2013.01); *F02D 2041/0092* (2013.01)

(58) Field of Classification Search
CPC .. F02D 41/00; F02D 41/009; F01L 2820/041; F02P 7/06; G01D 5/24495
See application file for complete search history.

(56) References Cited

U.S. PATENT DOCUMENTS 5,796,247 A * 8/1998 Pape .................. G01P 13/00
324/207.2
8,204,674 B2 * 6/2012 Kondo .................. F02D 41/221
73/114.26

(Continued)

FOREIGN PATENT DOCUMENTS

DE    19734595    2/1999
FR    2859784    3/2005
(Continued)

OTHER PUBLICATIONS

International Search Report for PCT/EP2020/060717 dated Aug. 5, 2020, 2 pages.
(Continued)

*Primary Examiner* — John Kwon
*Assistant Examiner* — Johnny H Hoang
(74) *Attorney, Agent, or Firm* — Nixon & Vanderhye

(57) ABSTRACT

A method for synchronizing an internal combustion engine includes: a) a first step of acquiring, by the camshaft sensor, signals corresponding to at least five cam edges x; b) a second step of determining the value, from the camshaft signal, of a first, second and third actual ratio; c) a third step of establishing, for each actual value ratio obtained in b), a list of possible cam edges x by comparing the values of the first, second and third actual ratios, respectively, with a tolerance window corresponding to a value of a first, second or third theoretical ratio for a given cam edge x, each weighted by a tolerance factor k; and d) a fourth step of determining the cam edge x seen by the camshaft sensor, the cam edge actually seen by the sensor corresponding to the cam edge x common to the three lists established in c).

9 Claims, 3 Drawing Sheets

(51) Int. Cl.
　　　*G01D 5/24*　　　(2006.01)
　　　*G01D 5/244*　　(2006.01)

(56) References Cited

U.S. PATENT DOCUMENTS

| | | | |
|---|---|---|---|
| 8,656,762 B2* | 2/2014 | Hoetzel | G01D 5/2492 |
| | | | 73/114.26 |
| 9,702,786 B2 | 7/2017 | Zouboff et al. | |
| 2002/0078925 A1* | 6/2002 | Kobayashi | F02D 41/009 |
| | | | 123/406.18 |
| 2006/0167615 A1* | 7/2006 | Kunibe | F02D 41/222 |
| | | | 701/114 |
| 2015/0114097 A1* | 4/2015 | Zouboff | F02D 41/009 |
| | | | 73/114.26 |

FOREIGN PATENT DOCUMENTS

| | | |
|---|---|---|
| FR | 2875541 | 3/2006 |
| FR | 2991720 | 12/2013 |
| WO | 93/12333 | 6/1993 |

OTHER PUBLICATIONS

Written Opinion of the ISA for PCT/EP2020/060717 dated Aug. 5, 2020, 5 pages.

* cited by examiner

METHOD FOR SYNCHRONIZING AN INTERNAL COMBUSTION ENGINE

This application is the U.S. national phase of International Application No. PCT/EP2020/060717 filed Apr. 16, 2020 which designated the U.S. and claims priority to FR Patent Application No. 1904207 filed Apr. 19, 2019, the entire contents of each of which are hereby incorporated by reference.

BACKGROUND OF THE INVENTION

Field of the Invention

The technical field of the present invention relates to methods for synchronizing internal combustion engines and more particularly to methods for determining the position of pistons during an engine cycle of an internal combustion engine.

Description of the Related Art

An internal combustion engine is formed in particular of an engine block containing a crankshaft, at least one piston movable in a cylinder under the action of the crankshaft, and a cylinder head associated with a camshaft on top of the engine block. The movement of the piston then drives the crankshaft and actuates, amongst other things, one or more camshafts, which control valves. The valves control the intake of fuel into and the exhaust of the combustion gases in the combustion chambers or cylinders.

Precise control of the internal combustion engine is essential for car manufacturers in order to determine and optimize the best time to ignite the fuel in the cylinder. This helps to optimize fuel consumption as well as exhaust gas emissions. To do this, it is necessary to know the position of the pistons in the cylinders and the phase of the engine cycle in which they are located. This is called phasing or synchronization of the internal combustion engine.

The engine synchronization can be achieved by combining in particular two pieces of information provided by a crankshaft sensor and a camshaft sensor.

The crankshaft sensor, by cooperating with a crankshaft target, makes it possible to generate a crankshaft signal and to estimate the position of the piston(s) in the cylinders and thus the position of the engine. This position can be estimated with an asymmetry of about 360 degrees. This means that the position of the piston in the cylinder is known, but it is not known in which phase of the combustion cycle it is. This asymmetry is generally called the signature or gap.

The additional information comes in particular from a camshaft sensor that cooperates with a camshaft target and makes it possible to generate a camshaft signal. The camshaft target has a known number of teeth that cooperate with the sensor to generate signals or cam edges that provide information about the phasing of the engine. Thus, the cooperation with the crankshaft signal makes it possible to determine the number of cam edges seen by the camshaft sensor. Ultimately, this makes it possible to determine the correct phasing, i.e., it is possible to determine with certainty where each piston is located in the combustion cycle.

When the crankshaft sensor fails, the synchronization method described above is no longer effective, because the crankshaft target gap is no longer recognized. Another method must then be implemented in order to determine the number of the cam edge seen by the camshaft sensor and to associate this edge with the engine position. When this association is achieved, the synchronization is performed.

This method is based on the measurement of the times separating the cam edges seen by the sensor and on the calculation of an actual ratio $N=(T_n+T_{n-3})/(T_{n-1}+T_{n-2})$ where $T_n$ represents the last value measured between the last two active edges, $T_{n-1}$ the previous value, $T_{n-2}$ and $T_{n-3}$ the time values between the still previous edges. This measurement is compared with a theoretical ratio T of the same formula but calculated from the measurements of the angles between the cam edges of the camshaft target.

In order to take into account engine acyclism and speed variations at start-up, it is usual to consider that the calculated ratio is correct if it differs by a tolerance factor k from the theoretical value. For example, if the theoretical ratio T is equal to 1 for a given edge, the edge seen is considered plausible if it is within the interval [T/k; T*k] for a given edge.

The method uses four time durations. Therefore, five edges detected by the camshaft sensor are needed to start the ratio analysis. Due to the tolerance factor, the method eliminates implausible edges, but there are often several plausible edges left after the fifth. It is therefore necessary to wait for the acquisition of a new cam edge.

Synchronization takes place in particular when the engine is started. There is thus a need to reduce the synchronization time of an internal combustion engine, especially when the engine is started. Combustion must not take place if the synchronization has not been carried out.

The invention is intended to overcome the above-mentioned disadvantages.

SUMMARY OF THE INVENTION

The invention relates to a method for synchronizing an internal combustion engine comprising at least one cylinder, at least one piston movable in the at least one cylinder and driving a crankshaft cooperating with a camshaft, said camshaft cooperating with a known target of the camshaft having a number of cam edges x, and a camshaft sensor generating a camshaft signal as a function of the number of cam edges x, said method comprising:
- a first step of acquiring, by the camshaft sensor, signals corresponding to at least five cam edges x,
- a second step of determining the value, from the camshaft signal, of a first, second and third actual ratio (N1, N2, N3) for a given cam edge x,
- a third step of establishing, for each actual ratio value (N1, N2, N3) obtained in the second step, a list of possible cam edges x by comparing the values of the first, second and third actual ratios (N1, N2, N3), respectively, with a tolerance window corresponding to a value of a first, second or third theoretical ratio (T1, T2, T3) for a given cam edge x, each weighted by a tolerance factor k, and
- a fourth step of determining the cam edge x seen by the camshaft sensor, the cam edge actually seen by the sensor corresponding to the cam edge x common to the three lists established in the third step.

According to a feature of the method according to the invention, a cam edge x is considered possible when the values of the first, second and third actual ratios (N1, N2, N3) are, respectively, within a range [T1/k; T1*k], [T2/k; T2*k] and [T3/k; T3*k] for a given cam edge x.

According to another feature of the method according to the invention, the tolerance factor k is a constant number belonging to the set between 1.5 and 3, preferably 2.3.

According to yet another feature of the method according to the invention, the first, second and third theoretical ratios (T1, T2, T3) are determined from the angles a between the cam edges x and are of the following formulas:

$$T1 = (T_a + T_{a-2}) / (T_{a-1} + T_{a-3})$$

$$T2 = (T_a + T_{a-1}) / (T_{a-2} + T_{a-3}),\text{ and}$$

$$T3 = (T_a + T_{a-3}) / (T_{a-1} + T_{a-2}),$$

where
$T_a$ is the angle between the cam edges x and x-1,
$T_{a-1}$ is the angle between the cam edges x-1 and x-2,
$T_{a-2}$ is the angle between the cam edges x-2 and x-3, and
$T_{a-3}$ is the angle between the cam edges x-3 and x-4.

According to yet another feature of the method according to the invention, the first, second and third actual ratios (N1, N2, N3) are determined from the measurement of the times separating the cam edges x and satisfy the following formulas:

$$N1 = (T_n + T_{n-2}) / (T_{n-1} + T_{n-3})$$

$$N2 = (T_n + T_{n-1}) / (T_{n-2} + T_{n-3}),\text{ and}$$

$$N3 = (T_n + T_{n-3}) / (T_{n-1} + T_{n-2}),$$

where
$T_n$ is the time between the last two cam edges seen by the sensor,
$T_{n-1}$ is the time between the penultimate and the third-last cam edge seen by the sensor,
$T_{n-2}$ is the time between the third-last and the fourth-last cam edge seen by the sensor, and
$T_{n-3}$ is the time between the fourth-last and the fifth-last cam edges seen by the sensor An advantage of the present invention is that the engine can be synchronized quickly without the need for data from the crankshaft sensor.

Another advantage of the present invention is the robustness of the method for synchronizing the internal combustion engine.

BRIEF DESCRIPTION OF THE DRAWINGS

Further features, advantages and details of the invention will be better understood from the following further description in conjunction with the drawings, in which.

DESCRIPTION OF THE PREFERRED EMBODIMENTS

Figure 2:
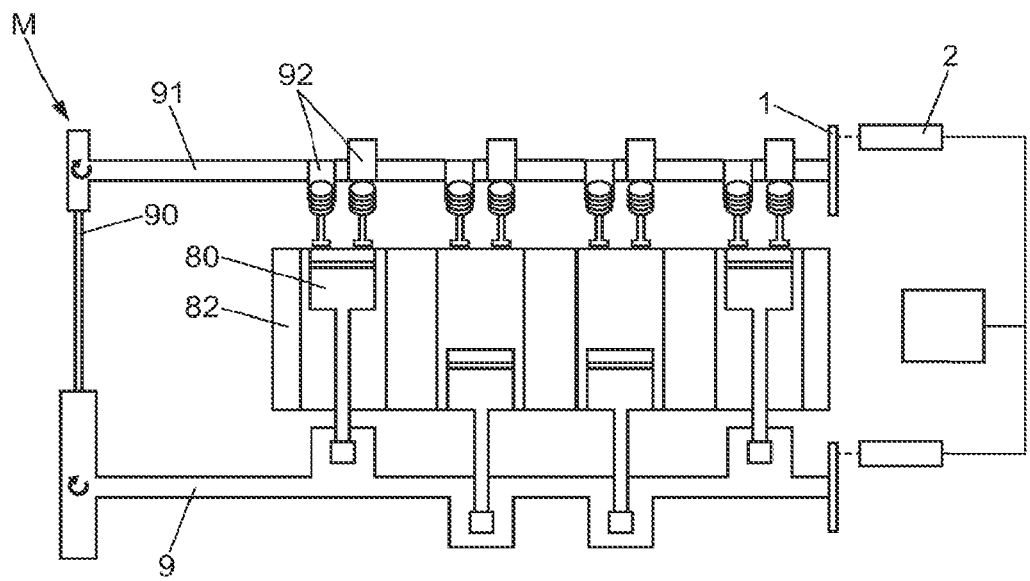
FIG. 2 schematically shows an example of an internal combustion engine.

As illustrated in FIG. 2, an internal combustion engine M generally consists of at least one cylinder 82 and at least one piston 80 movable between a top position and a bottom position in the at least one cylinder 82. The position of the reference tooth is known and makes it possible to associate each tooth of the crankshaft signal with an engine position. In particular, the crankshaft 9 cooperates with a camshaft 91, which in turn cooperates with a camshaft target 1 having a number of cam edges x spaced apart from each other by an angle a. In an internal combustion engine M, the configuration of the camshaft target 1 is known. The engine also comprises a camshaft sensor 2 that generates a camshaft signal as a function of the number of cam edges x. Thus, for a given camshaft target 1, the resulting camshaft signal is also known.

The internal combustion engine M is then synchronized when the cam edge x actually seen by the camshaft sensor 2 is known.

Figure 1:
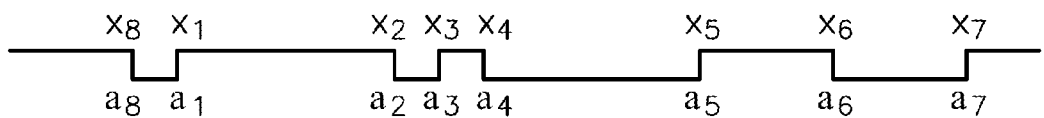
FIG. 1 shows an example of a camshaft signal generated by a camshaft sensor.

FIG. 1 is an example of a camshaft signal generated by a camshaft sensor. In this example, the camshaft signal has eight cam edges $x_1$, $x_2$ $x_3$, $x_4$, $x_5$, $x_6$ $x_7$ and $x_8$. For each of the camshaft edges x, it is possible to determine a first T1, a second T2 and a third T3 theoretical ratio. Said first, second and third theoretical ratios are determined from the angles a between the cam edges x and are of the following formulas:

$$T1 = (T_a + T_{a-2}) / (T_{a-1} + T_{a-3})$$

$$T2 = (T_a + T_{a-1}) / (T_{a-2} + T_{a-3}),\text{ and}$$

$$T3 = (T_a + T_{a-3}) / (T_{a-1} + T_{a-2}),$$

where
$T_a$ is the angle between the cam edges x and x-1,
$T_{a-1}$ is the angle between the cam edges x-1 and x-2,
$T_{a-2}$ is the angle between the cam edges x-2 and x-3, and
$T_{a-3}$ is the angle between the cam edges x-3 and x-4.

Thus, for each cam edge x, three theoretical ratios are available and each theoretical ratio is weighted by a tolerance factor k so as to define a tolerance window. The limits of this tolerance window are obtained by dividing and multiplying the theoretical ratio by the tolerance factor k.

This tolerance factor k is dependent in particular on the parameters of the internal combustion engine, but also takes into account speed variations when starting the engine, moreover under conditions such as a cold start or with a weak battery. The tolerance factor k is a constant number in the range of 1.5 to 3, preferably 2.3.

For each cam edge x, there are three theoretical ratios T1, T2, T3 and, for each ratio T1, T2, T3, there is a tolerance window corresponding to [T1/k; T1*k], [T2/k; T2*k] and [T3/k; T3*k].

Thus, for the example related to FIG. 1, the angle $a_1$ between the cam edges $x_8$ and $x_1$ is equal to 30 degrees. The angle $a_2$ between the cam edges $x_1$ and $x_2$ is equal to 150 degrees. The angle $a_3$ between the cam edges $x_2$ and $x_3$ is equal to 30 degrees. The angle $a_4$ between the cam edges $x_3$ and $x_4$ is equal to 30 degrees. The angle $a_5$ between the cam edges $x_4$ and $x_5$ is equal to 150 degrees. The angle $a_6$ between the cam edges $x_5$ and $x_6$ is equal to 90 degrees. The angle $a_7$ between the cam edges $x_6$ and $x_7$ is equal to 90 degrees. The angle $a_8$ between the cam edges $x_7$ and $x_8$ is equal to 150 degrees. All the angular values are expressed in degrees crank angle and one camshaft revolution represents 7200 crank angle.

These data make it possible to obtain the theoretical ratios T1, T2 and T3 as well as the limits of the corresponding tolerance windows for each cam edge x. For the example related to FIG. 1, the data are illustrated in tables 1 to 3 below. Table 1 shows the data in relation to the first theoretical ratio T1, table 2 shows the data in relation to the second theoretical ratio T2, and table 3 shows the data in relation to the third theoretical ratio T3. The coefficient k was set to 2.3.

TABLE 1

| Cam edges | $x_1$ | $x_2$ | $x_3$ | $x_4$ | $x_5$ | $x_6$ | $x_7$ | $x_8$ |
|---|---|---|---|---|---|---|---|---|
| T1 | 0.5 | 2.5 | 0.2 | 3.0 | 1 | 0.67 | 2 | 1 |
| T1/k | 1.15 | 5.75 | 0.46 | 6.9 | 2.3 | 1.53 | 4.6 | 2.3 |
| T1 * k | 0.217 | 1.087 | 0.087 | 1.304 | 0.44 | 0.29 | 0.87 | 0.44 |

TABLE 2

| Cam edges | $x_1$ | $x_2$ | $x_3$ | $x_4$ | $x_5$ | $x_6$ | $x_7$ | $x_8$ |
|---|---|---|---|---|---|---|---|---|
| T2 | 1 | 0.75 | 1 | 0.333 | 1 | 4 | 1 | 1 |
| T2/k | 2.3 | 1.725 | 2.3 | 0.767 | 2.3 | 9.2 | 2.3 | 2.3 |
| T2 * k | 0.44 | 0.326 | 0.44 | 0.145 | 0.44 | 1.74 | 0.44 | 0.44 |

TABLE 3

| Cam edges | $x_1$ | $x_2$ | $x_3$ | $x_4$ | $x_5$ | $x_6$ | $x_7$ | $x_8$ |
|---|---|---|---|---|---|---|---|---|
| T3 | 0.5 | 1.333 | 1 | 0.333 | 5 | 0.67 | 0.5 | 1.667 |
| T3/k | 1.15 | 3.067 | 2.3 | 0.767 | 11.5 | 1.53 | 1.15 | 3.833 |
| T3 * k | 0.217 | 0.58 | 0.44 | 0.145 | 2.174 | 0.29 | 0.22 | 0.725 |

The method according to the invention allows the engine to be quickly synchronized during start-up, for example, by using theoretical data.

The method according to the invention includes determining 3 actual ratios N1, N2 and N3, each determined from the measurement of the times separating the cam edges x and satisfying the following formulas:

$$N_1 = (T_n + T_{n-2})/(T_{n-1} + T_{n-3}),$$

$$N_2 = (T_n + T_{n-1})/(T_{n-2} + T_{n-3}), \text{ and}$$

$$N_3 = (T_n + T_{n-3})/(T_{n-1} + T_{n-2}),$$

where
- $T_n$ is the time between the last two cam edges seen by the sensor,
- $T_{n-1}$ is the time between the penultimate and the third-last cam edge seen by the sensor,
- $T_{n-2}$ is the time between the third-last and the fourth-last cam edge seen by the sensor, and
- $T_{n-3}$ is the time between the fourth-last and the fifth-last cam edges seen by the sensor.

Figure 3:
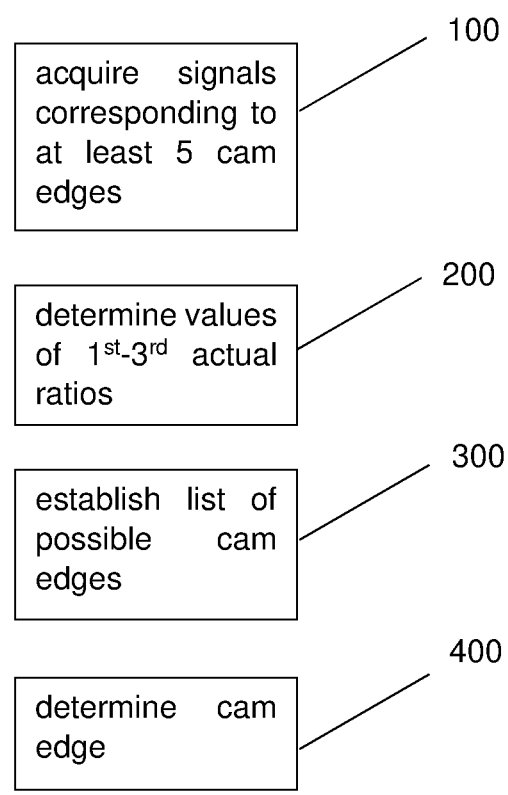
FIG. 3 is a flowchart illustrating aspects of the present invention.

Thus, as illustrated in FIG. 3, it is necessary for the camshaft sensor to acquire five signals corresponding to at least five cam edges x (100). Once the fifth cam edge x is detected by the sensor, the method according to the invention makes it possible to determine which cam edge x it corresponds to and thus to synchronize the engine.

Once the five cam edges have been acquired, it is possible to determine the value of a first, second and third actual ratio (N1, N2, N3) (200).

Each actual ratio calculated makes it possible to establish a list of possible cam edges x for this fifth cam edge detected by the camshaft sensor (300). These lists are obtained by comparing the value of the actual ratios N1, N2 and N3 with the tolerance windows corresponding to the value of the first, second or third theoretical ratio for a given cam edge x. Thus, a cam edge x is considered possible when the values of the first, second and third actual ratios (N1, N2, N3) are, respectively, within an interval [T1/k; T1*k], [T2/k; T2*k] and [T3/k; T3*k] for a given cam edge x.

It follows that the cam edge x actually seen by the sensor corresponds to the cam edge x common to the previously established lists (400).

In the example in relation to FIG. 1 and in relation to tables 1, 2 and 3, if the following data are taken for the calculation of the first, second and third actual ratios:
- Tn=30,
- Tn-1=150,
- Tn-2=90, and
- Tn-3=90.

This makes it possible to calculate the actual ratios:
- N1=0.5
- N2=1
- N3=0.5

The list established in relation to the first theoretical ratio T1 makes the cam edges $x_1$, $x_5$, $x_6$ and $x_8$ possible because N1 is within the tolerance interval of the cam edges $x_1$, $x_5$, $x_6$ and $x_8$ for the first theoretical ratio T1.

The list established in relation to the second theoretical ratio T2 makes the cam edges $x_1$, $x_2$, $x_3$, $x_5$, $x_7$ and $x_8$ possible because N2 is within the tolerance interval of the cam edges $x_1$, $x_2$, $x_3$, $x_5$, $x_7$ and $x_8$ for the second theoretical ratio T2.

The list established in relation to the third theoretical ratio T3 makes the cam edges $x_1$, $x_3$, $x_4$, $x_6$ and $x_7$ possible because N3 is within the tolerance interval of the cam edges $x_1$, $x_3$, $x_4$, $x_6$ and $x_7$ for the third theoretical ratio T3.

The method according to the invention retains only the possible edges common to all three lists. In the previous example, only edge $x_1$ is common. The algorithm then determines that the last edge seen is edge number 1.

The method according to the invention thus makes it possible to synchronize an internal combustion engine without the need for data provided by a crankshaft sensor and also as soon as the camshaft sensor detects only 5 cam edges.

The invention claimed is:

1. A method for synchronizing an internal combustion engine including at least one cylinder, at least one piston movable in the at least one cylinder and driving a crankshaft cooperating with a camshaft, and a camshaft sensor, said camshaft cooperating with a target of the camshaft having a number of cam edges, the camshaft sensor generating a camshaft signal as a function of the number of cam edges, said method comprising:
  acquiring, by the camshaft sensor, signals corresponding to at least five cam edges;
  determining values, from the camshaft signal, of a first actual ratio, a second actual ratio, and a third actual ratio for each of the respective cam edges;

establishing, for each of the determined actual ratio values, a list of possible cam edges by comparing the respective values of the first, second, and third actual ratios with respective tolerance windows defined by respective values of a first theoretical ratio, a second theoretical ratio, and a third theoretical ratio for a respective cam edge, each being weighted by a tolerance factor k, the first, second, and third theoretical ratios being determined based on angles a between adjacent cam edges; and determining the cam edge sensed by the camshaft sensor, the determined cam edge corresponding to one of the cam edges common to each of the established lists of possible cam edges.

2. The method as claimed in claim 1, wherein the cam edges are considered possible when the respective values of the first, second, and third actual ratios within an interval [T1/k; T1*k], [T2/k; T2*k] and [T3/k; T3*k] for the respective cam edge, where
T1 is the first theoretical ratio,
T2 is the second theoretical ratio, and
T3 is the third theoretical ratio.

3. The method as claimed in claim 2, wherein the tolerance factor k is a constant number belonging to the set between 1.5 and 3.

4. The method as claimed in claim 2, wherein the tolerance factor k is a constant number that is 2.3.

5. The method as claimed in claim 2, wherein the first, second, and third actual ratios are determined from measurement of times separating the cam edges and satisfy the following formulas:

$$N1=(T_n+T_{n-2})/(T_{n-1}+T_{n-3}),$$

$$N2=(T_n+T_{n-1})/(T_{n-2}+T_{n-3}), \text{ and}$$

$$N3=(T_n+T_{n-3})/(T_{n-1}+T_{n-2}),$$

where
N1 is the first actual ratio,
N2 is the second actual ratio,
N3 is the third actual ratio,
$T_n$ is the time between the last two cam edges seen by the sensor,
$T_{n-1}$ is the time between the penultimate and the third-last cam edge seen by the sensor,
$T_{n-2}$ is the time between the third-last and the fourth-last cam edge seen by the sensor, and
$T_{n-3}$ is the time between the fourth-last and the fifth-last cam edges seen by the sensor.

6. The method as claimed in claim 1, wherein the tolerance factor k is a constant number belonging to the set between 1.5 and 3.

7. The method as claimed in claim 1, wherein the tolerance factor k is a constant number that is 2.3.

8. A method for synchronizing an internal combustion engine including at least one cylinder, at least one piston movable in the at least one cylinder and driving a crankshaft cooperating with a camshaft, and a camshaft sensor, said camshaft cooperating with a target of the camshaft having a number of cam edges, the camshaft sensor generating a camshaft signal as a function of the number of cam edges, said method comprising:

acquiring, by the camshaft sensor, signals corresponding to at least five cam edges;

determining values, from the camshaft signal, of a first actual ratio, a second actual ratio, and a third actual ratio for each of the respective cam edges;

establishing, for each of the determined actual ratio values, a list of possible cam edges by comparing the respective values of the first, second, and third actual ratios with respective tolerance windows defined by respective values of a first theoretical ratio, a second theoretical ratio, and a third theoretical ratio for a respective cam edge, each being weighted by a tolerance factor k; and determining the cam edge sensed by the camshaft sensor, the determined cam edge corresponding to one of the cam edges common to each of the established lists of possible cam edges, wherein the first, second, and third theoretical ratios are determined from the angles a between the cam edges x and are of the following formulas:

$$T1=(T_a+T_{a-2})/(T_{a-1}+T_{a-3})$$

$$T2=(T_a+T_{a-1})/(T_{a-2}+T_{a-2}), \text{ and}$$

$$T3=(T_a+T_{a-3})/(T_{a-1}+T_{a-2}),$$

where
T1 is the first theoretical ratio,
T2 is the second theoretical ratio,
T3 is the third theoretical ratio,
$T_a$ is the angle between the cam edges x and x-1,
$T_{a-1}$ is the angle between the cam edges x-1 and x-2,
$T_{a-2}$ is the angle between the cam edges x-2 and x-3, and
$T_{a-3}$ is the angle between the cam edges x-3 and x-4.

9. A method for synchronizing an internal combustion engine including at least one cylinder, at least one piston movable in the at least one cylinder and driving a crankshaft cooperating with a camshaft, and a camshaft sensor, said camshaft cooperating with a target of the camshaft having a number of cam edges, the camshaft sensor generating a camshaft signal as a function of the number of cam edges, said method comprising:

acquiring, by the camshaft sensor, signals corresponding to at least five cam edges;

determining values, from the camshaft signal, of a first actual ratio, a second actual ratio, and a third actual ratio for each of the respective cam edges;

establishing, for each of the determined actual ratio values, a list of possible cam edges by comparing the respective values of the first, second, and third actual ratios with respective tolerance windows defined by respective values of a first theoretical ratio, a second theoretical ratio, and a third theoretical ratio for a respective cam edge, each being weighted by a tolerance factor k; and determining the cam edge sensed by the camshaft sensor, the determined cam edge corresponding to one of the cam edges common to each of the established lists of possible cam edges, wherein the first, second, and third actual ratios are determined from measurement of times separating the cam edges and satisfy the following formulas:

$$N1=(T_n+T_{n-2})/(T_{n-1}+T_{n-3}),$$

$$N2=(T_n+T_{n-1})/(T_{n-2}+T_{n-3}), \text{ and}$$

$$N3=(T_n+T_{n-3})/(T_{1-1}+T_{n-2}),$$

where
N1 is the first actual ratio,
N2 is the second actual ratio,
N3 is the third actual ratio, $T_n$ is the time between the last two cam edges seen by the sensor, $T_{n-1}$ is the time between the penultimate and the third-last cam edge seen by the sensor, $T_{n-2}$ is the time between the third-last and the fourth-last cam edge seen by the sensor, and $T_{n-3}$ is the time between the fourth-last and the fifth-last cam edges seen by the sensor.

* * * * *